United States Patent
Pfeiffer et al.

(10) Patent No.: US 12,236,644 B2
(45) Date of Patent: Feb. 25, 2025

(54) OPERATION OF A HOUSEHOLD COOKING APPLIANCE WITH AT LEAST ONE CAMERA

(71) Applicant: BSH Hausgeräte GmbH, Munich (DE)

(72) Inventors: Josef Pfeiffer, Übersee (DE); Hans-Martin Eiter, Kirchweidach (DE)

(73) Assignee: BSH Hausgeräte GmbH, Munich (DE)

( * ) Notice: Subject to any disclaimer, the term of this patent is extended or adjusted under 35 U.S.C. 154(b) by 468 days.

(21) Appl. No.: 17/628,237

(22) PCT Filed: Aug. 5, 2020

(86) PCT No.: PCT/EP2020/071961
§ 371 (c)(1),
(2) Date: Jan. 19, 2022

(87) PCT Pub. No.: WO2021/032477
PCT Pub. Date: Feb. 25, 2021

(65) Prior Publication Data
US 2022/0414937 A1    Dec. 29, 2022

(30) Foreign Application Priority Data
Aug. 19, 2019   (DE) .................... 10 2019 212 364.3

(51) Int. Cl.
| | |
|---|---|
| *A23L 5/10* | (2016.01) |
| *A47J 36/32* | (2006.01) |
| *F27D 21/02* | (2006.01) |
| *G06T 7/90* | (2017.01) |
| *H04N 9/64* | (2023.01) |

(Continued)

(52) U.S. Cl.
CPC .......... *G06T 7/90* (2017.01); *A23L 5/10* (2016.08); *A47J 36/32* (2013.01); *F27D 21/02* (2013.01); *H04N 9/64* (2013.01); *H04N 9/77* (2013.01); *A23V 2002/00* (2013.01);
(Continued)

(58) Field of Classification Search
CPC .... G06T 7/90; A23L 5/10; A47J 36/32; F27D 21/02; H04N 9/64; H04N 9/77
See application file for complete search history.

(56) References Cited

U.S. PATENT DOCUMENTS

| | | | | |
|---|---|---|---|---|
| 2011/0002677 A1* | 1/2011 | Cochran | ................ | H05B 3/148 392/407 |
| 2013/0186887 A1* | 7/2013 | Hallgren | ................ | H05B 6/688 219/702 |

(Continued)

FOREIGN PATENT DOCUMENTS

| | | |
|---|---|---|
| DE | 102005014713 A1 | 10/2006 |
| EP | 0682243 A1 | 11/1995 |
| JP | S61265429 A | 11/1986 |

OTHER PUBLICATIONS

National Search Report DE 10 2019 212 364.3 dated Jul. 16, 2020.
International Search Report PCT/EP2020/071961 dated Oct. 8, 2020.

*Primary Examiner* — Steven N Leff
(74) *Attorney, Agent, or Firm* — Michael E. Tschupp; Andre Pallapies; Brandon G. Braun (57) ABSTRACT

In a method for operating a household cooking appliance, a camera records a pixel-based image from a cooking chamber of the household cooking appliance. The image is evaluated with exclusion of brightness values of associated pixels thereof.

13 Claims, 4 Drawing Sheets

(51) Int. Cl.
*H04N 9/77* (2006.01)
*H04N 5/77* (2006.01)

(52) U.S. Cl.
CPC ............... *F27D 2021/026* (2013.01); *G06T 2207/10024* (2013.01); *H04N 5/77* (2013.01)

(56) References Cited

U.S. PATENT DOCUMENTS

| | | | |
|---|---|---|---|
| 2013/0306627 A1* | 11/2013 | Libman | H05B 6/687 |
| | | | 219/709 |
| 2015/0185138 A1 | 7/2015 | Richardson | |
| 2017/0074522 A1* | 3/2017 | Cheng | F24C 7/085 |
| 2018/0172510 A1* | 6/2018 | Rosen | G01J 3/0205 |
| 2019/0242584 A1 | 8/2019 | Ebert | |
| 2020/0069111 A1 | 3/2020 | Eiter | |

* cited by examiner

OPERATION OF A HOUSEHOLD COOKING APPLIANCE WITH AT LEAST ONE CAMERA

CROSS-REFERENCES TO RELATED APPLICATIONS

This application is the U.S. National Stage of International Application No. PCT/EP2020/071961, filed Aug. 5, 2020, which designated the United States and has been published as International Publication No. WO 2021/032477 A1 and which claims the priority of German Patent Application, Serial No. 10 2019 212 364.3, filed Aug. 19, 2019, pursuant to 35 U.S.C. 119 (a)-(d).

The contents of International Application No. PCT/EP2020/071961 and German Patent Application, Serial No. 10 2019 212 364.3 are incorporated herein by reference in their entireties as if fully set forth herein.

BACKGROUND OF THE INVENTION

The invention relates to a method for the operation of a household cooking appliance with a cooking chamber and with at least one camera which is configured for recording pixel-based images from the cooking chamber, in which at least one image from the cooking chamber is recorded by means of the at least one camera and the image is evaluated. The invention further relates to a household cooking appliance having a cooking chamber and at least one camera for recording pixel-based images, wherein the household cooking appliance is configured for carrying out the method. The invention is particularly advantageously applicable to baking ovens, microwave appliances, steam treatment appliances or any combinations thereof.

DE 10 2016 215 550 A1 discloses a method for establishing a degree of browning of food to be cooked in a cooking chamber of a household cooking appliance, which household cooking appliance has a camera oriented into the cooking chamber and a light source for illuminating the cooking chamber, and wherein a reference image is recorded by means of the camera, a first measured image is recorded at a first brightness of the light source, a second measured image is recorded at a second brightness of the light source, a difference image is generated from the first measured image and the second measured image and the difference image is compared with the reference image. A household cooking appliance has a camera oriented into a cooking chamber, a light source for illuminating the cooking chamber and a control apparatus coupled to the camera and the light source, wherein the household cooking appliance is configured for carrying out the method.

DE 10 2005 014 713 A1 discloses a sensor apparatus with a data processing unit for determining a degree of browning of a food to be cooked arranged in a cooking chamber, and with at least one sensor for detecting a radiation intensity reflected from the food to be cooked. In order to provide a sensor apparatus for cooking appliances, by means of which a degree of browning of a food to be cooked may be determined in a manner which is safe, reliable, and in particular independent of a size and shape of the food to be cooked, it is proposed that the data processing unit is provided for determining a relevance parameter for a characteristic parameter of the detected radiation intensity as a function of the temporal progression of the detected radiation intensity.

WO 2014/053002 A2 provides a device for characterizing a chromatic property of foods. The device comprises a light source which is arranged in order to emit light with at least two wavelengths or wavelength ranges. The light source is also arranged in order to deflect the light onto a surface of at least the food. The device further comprises a detector which is positioned in order to detect at least one portion of the reflected light and which is arranged in order to generate an output which indicates an intensity of the detected reflected light. The device is arranged such that corresponding information is generated for the at least two wavelengths or wavelength ranges. A relationship between the information for one of the at least two wavelengths or wavelength ranges and the information for the other or another of the at least two wavelengths or wavelength ranges indicates the chromatic property of the surface of the food.

DE 10 2017 206 056 A1 discloses a method for operating a cooking appliance in which a cooking chamber is irradiated with light of different wavelength ranges and light originating from the cooking chamber is measured, wherein measurement results are spectroscopically evaluated and an operation of the cooking appliance is modified as a function of a result of the spectroscopic evaluation. A cooking appliance is configured for performing the method and has: a cooking chamber, at least one light source for radiating light into the cooking chamber and at least one light sensor for measuring light reflected in the cooking chamber, wherein the cooking appliance also has: an evaluation apparatus for spectroscopic evaluation of the measurement results determined by the at least one light sensor and a control apparatus for controlling a cooking sequence as a function of a result of the evaluation.

EP 0 682 243 A1 discloses a device and a method specified for measuring the degree of browning of a food to be cooked, in particular of a baked item, with at least one radiation source which generates a measured radiation and a reference radiation of different wavelength ranges, which are both radiated via an optical system onto the food to be cooked, the reflection and back scattering thereof being influenced differently by the degree of browning of the food to be cooked, with a measuring sensor for detecting the radiation emitted by the food to be cooked, with a reference sensor for detecting the intensities of the measured radiation and the reference radiation, and with an apparatus for determining the degree of browning from the intensity of the measured radiation detected by the measuring sensor, from the intensity of the reference radiation detected by the measuring sensor, from the intensity of the measured radiation detected by the reference sensor, and from the intensity of the reference radiation detected by the reference sensor.

JP 61265429 A discloses a method in which a surface of a food to be cooked by heating is irradiated with two types of light with in each case different wavelengths, and the reflected light is detected by a photometer. The food is heated by a heating apparatus and irradiated with light sources with different emission wavelengths, in order to detect the rays reflected from the food by means of the photometer with sensitivities for these two emission wavelengths. The emission intensity of the first light source has its maximum at a wavelength of 300 W, 600 nm, whilst the emission intensity of the second light source has its maximum at a wavelength of 700 W, 1200 nm. The surface state of the food to be cooked may be determined by the light rays. Accordingly, cooking which always exhibits a good end state may be brought about by presetting the detection level of reflected rays which are suitable for a cooking menu.

BRIEF SUMMARY OF THE INVENTION

It is the object of the present invention to remedy at least partially the drawbacks of the prior art, and in particular to provide an improved option for operating a household cooking appliance based on an image evaluation of a cooking chamber contents.

This object is achieved according to the features of the independent claims. Advantageous embodiments form the subject of the dependent claims, the description and the drawings.

The object is achieved by a method for operating a household cooking appliance with a cooking chamber and with at least one camera which is configured for recording pixel-based images from the cooking chamber, in which (a) at least one image from the cooking chamber is recorded by means of the at least one camera and (b) the image is evaluated with exclusion of the brightness values of the associated pixels thereof.

This method provides the advantage that image data recorded from the cooking chamber may be evaluated substantially independently of a brightness distribution in the cooking chamber which is generated, for example, by a cooking chamber lighting and/or an incidence of ambient light. In other words, the problem of the typically non-homogenous brightness distribution in the cooking chamber for image evaluation is solved by means of the method. In particular, the evaluation is advantageously independent of an insertion level and height of the food to be cooked. The advantage is also achieved of greater robustness relative to changes in brightness which are caused by the light sources and which, for example, are produced by an operating temperature, an age of the light source and/or by a changing light incidence through a cooking chamber door. The method is also advantageously substantially independent of structural changes of the lighting arrangement, such as a number and/or arrangement of light sources for the cooking chamber illumination. Moreover, the advantage results therefrom that the image evaluation may be performed in a simpler and more rapid manner, in particular by reducing the quantity of data to be evaluated.

The household cooking appliance may, in particular, be a baking oven, a microwave appliance, a steam treatment appliance or any combination thereof, for example a baking oven with an additional microwave and/or steam treatment function. The cooking chamber may also be denoted as a muffle or oven. The household cooking appliance may have one or more cooking chambers, for example in the form of a double oven with two cooking chambers arranged one on top of the other.

It is a development that the cooking chamber has a plurality of insertion levels for positioning carriers for food to be cooked, such as oven racks, baking sheets, etc. The cooking chamber has a loading opening which is typically arranged on the front side and which is closable by means of a cooking chamber door.

The at least one camera records pixel-based images, wherein a plurality of color space coordinates or the associated values thereof are assigned to each picture element or pixel. This may also be expressed such that an image has a plurality of color space channels (hereinafter also denoted simply as "channels") which denote the possible color space coordinates.

It is a development that the camera is a color camera. The pixels of a recorded color image in this case are assigned a plurality of colors or color space channels, for example red, green and blue in the case of an RGB image.

It is a development that the camera is a black and white camera which in the shortest possible interval records a series of a plurality of (1-channel) images, wherein different light colors are used for illuminating the individual images, for example red light, green light and blue light. The individual (1 channel) images of the series could be concatenated and then viewed as a color image.

If food to be cooked is located in the cooking chamber, the at least one recorded image typically represents the food to be cooked (for example one or more arranged and distributed prepared dishes) and frequently also regions of the cooking chamber such as a cooking chamber wall. In a development, the image region which does not represent any food to be cooked may remain unconsidered for the evaluation. To this end, for example, an object recognition may be performed on the food to be cooked. The identification of image areas which contain food to be cooked and image areas which do not contain any food to be cooked, but for example show a cooking chamber wall, is known in principle and thus is not described here in further detail.

In a development, the at least one cooking chamber camera is arranged in an upper half of the cooking chamber in order to be able to record the food to be cooked, in particular over the entire surface. In particular, the at least one cooking chamber camera may be arranged in the region of a ceiling, a left-hand side wall, a right-hand side wall, a rear wall and/or the cooking chamber door. By way of example, a cooking chamber camera may be arranged in the region of the ceiling of the cooking chamber and a further cooking chamber camera in the upper third or quarter of the left-hand side wall or the right-hand side wall.

It is a development that the household cooking appliance has at least one lighting apparatus, for example comprising one or more light sources, in particular light emitters, for illuminating the cooking chamber. The light sources may be arranged in principle in any manner relative to the cooking chamber, for example in a ceiling, in an upper half of the lateral cooking chamber walls (left-hand side wall, right-hand side wall, rear wall) in the cooking chamber door, etc. In particular, at least one light source may be arranged in the vicinity of a camera.

The image evaluation, for example for determining the browning of one or more prepared dishes, may thus be undertaken by excluding the brightness values of the pixels of at least one recorded image.

It is a development that the brightness values are not considered for the evaluation and thus are excluded, but are still present in the image data of the evaluated image. This may be advantageous, for example, if the image is additionally provided to be displayed to a user on a screen.

On the basis of the evaluation or based on the result of the evaluation, the household cooking appliance may trigger at least one action, for example adapt a cooking process (for example a cooking chamber temperature) to a recognized degree of cooking, determine and optionally display a remaining time, interrupt the cooking process, output a message to a user and/or transfer to a different cooking phase (for example a warming phase), etc.

It is an embodiment that in step (b) the sub-steps (b1) are performed such that an image is generated from the recorded image (denoted hereinafter without limiting the generality as a "brightness-normalized" image) in which the brightness values of the associated pixels have been removed and (b2) such that the brightness-normalized image is evaluated. The brightness-normalized image no longer has, therefore, any brightness information. This results in the advantage that a quantity of data and thus also a requirement for a computing power which is needed for the evaluation may be significantly reduced.

It is an embodiment that in step (b1) the brightness-normalized image is generated from an image, the pixels thereof in each case having a plurality of color space coordinates including a brightness coordinate, by the brightness coordinate being removed. This permits a particularly simple removal or exclusion of the brightness values by simply eliminating the brightness coordinate(s). In other words, in the brightness-normalized image the channel representing the brightness coordinate ("brightness channel") has been eliminated. For implementing this embodiment, the image from which the brightness-normalized image is generated, or the pixels thereof is thus described by a color space which has the brightness as a separate color space coordinate. The remaining color space coordinates of the brightness-normalized image are also denoted hereinafter as "color coordinates". The color coordinates thus span a brightness-normalized color space. Specific value tuples of the color coordinates may thus be depicted on a color location of the brightness-normalized color space.

It is an embodiment that the brightness-normalized image is generated by eliminating the brightness channel from an HSX image. In this case, the advantage is achieved that an HSX image uses a widespread color space representation which may also be easily evaluated. Additionally, the quantity of pixels may be reduced by the quantity of data of the brightness channel. An HSX image is to be understood to mean, in particular, an image, the color space coordinates thereof comprising a color value (English "hue"), a color saturation (English "saturation"), and a brightness value. The brightness-normalized image may alternatively be generated by eliminating the brightness channel, for example from an image present in a YUV format, YIQ format, etc.

The color value may be represented or specified as a color angle on the color wheel (for example with 0° for red, 120° for green, 240° for blue). The color saturation may be represented as a percentage value (for example where 0%=neutral gray, 50%=less saturated color, 100%=saturated, pure color) corresponding to an interval from zero to one. The color value and the color saturation form the two color coordinates which produce, for example, a circular, brightness-normalized (H, S) color space.

The HSX image may be present in a plurality of variants (where X=V, L, B or I) which differ in the representation of the brightness value, for example as an
  HSV image in which the brightness value (English "value", also called the darkness level) is represented as a percentage value (0%=no brightness, 100%=full brightness) corresponding to an interval from zero to one;
  HSL image with the relative brightness (English "lightness") instead of the light value;
  HSB image with the absolute brightness (English "brightness") instead of the light value;
  HSI image with the light intensity (English "intensity") instead of the light value.

Since the brightness channel X is eliminated, all variants of an HSX image may be used equally.

It is an embodiment that the pixels of the image recorded in step (a) do not have a separate brightness coordinate and in step (b1) the recorded image is converted into an image, the pixels thereof in each case having a plurality of color space coordinates including a brightness coordinate. Thus the brightness values or the brightness information advantageously may be excluded or eliminated relatively simply from the recorded images, which do not have a separate brightness channel.

It is an embodiment that in step (a) an RGB image or CMYK image is recorded and in step (b1) initially the RGB image or CMYK image is converted into an HSX image and then the brightness-normalized ("HS") image is generated from the HSX image by removing the brightness values. Thus the advantage is achieved that the color images, frequently generated by a color camera in RGB format or CMYK format, are able to be used for carrying out the method. The transformation into an HSX image is generally known for the RGB to HSV transformation, for example according to the set of formulae of Gonzalez and Woods, Foley and Van Dam or Travis. Relative to an RGB image, by using an HSX image a reduction is achieved in the quantity of data by a third, and even by half relative to a CMYK image.

However, the method is not limited to the use of RGB images, CMYK images, HSX images, etc.

It is an embodiment that the image for determining a degree of cooking of food to be cooked illustrated in the image (i.e. one or more different foods to be cooked) is evaluated using at least one remaining color coordinate, for example based on an evaluation of the color value, the color saturation or a color location of a brightness-normalized HSX image or HS image determined from the color value and the color saturation.

It is a development that the degree of cooking of a food to be cooked is determined by evaluating the individual or combined pixels of this food to be cooked in the brightness-normalized image. As a result, a location dependency or spatial distribution of the degree of cooking may also be considered.

It is a development that the degree of cooking of a food to be cooked is determined by calculating a total color location for the food to be cooked. This may be carried out, for example, by—if necessary weighted-value averaging of the values of at least one color coordinate of the pixels belonging to the food to be cooked.

A degree of cooking may generally be understood to mean a measured variable which illustrates or represents different cooking states with the end points "not cooked" and "cooked". In the present case, a change in a degree of cooking is identified by establishing a color change on the surface of the food to be cooked. The current color and/or a color change thus represent a quantifiable indicator of the degree of cooking.

It is a development that the degree of cooking is a degree of browning. In contrast to a determination of the degree of browning used hitherto, using an increasing darkening of the food to be cooked, in the present case the degree of browning may be established for example from a color change, for example from a non-brown color, such as green, to brown. This might correspond in the case of an HS image to a change of a color location in a (H, S) plane, for example from green (H=120°; S=100%) to brown (H=20°; S=75%). However, other degrees of cooking may also be determined, rather than a degree of browning. Thus with an increasing degree of cooking specific foods to be cooked lose their color, or with an increasing degree of cooking it may result in a color change which is different from brown. This may be considered, for example, when the type of food to be cooked is known in advance, for example due to a user input or an automatic determination.

The degree of cooking or the reaching of a target degree of cooking may be determined over the entire surface of a food to be cooked ("globally") or determined separately for different partial regions of the food to be cooked ("locally"). In particular, in the case of a local determination of the degree of cooking, at least one action may be triggered by the cooking appliance when a target degree of cooking is already reached in a partial region, is reached for a plurality of partial regions or is reached for all partial regions.

It is an embodiment that reaching a target degree of cooking of the food to be cooked under consideration is determined by reaching a target color point defined by the remaining color coordinates or an environment thereof (for example of Hziel (H-target)±2° and Sziel (S-target)±5%). This permits a particularly simple determination of a finished cooking state of the food to be cooked under consideration. In a development, the target degree of cooking may be established before or at the start of a cooking process. If, for example, during a cooking program a specific prepared dish (for example chicken, pizza, casserole, etc.) and a desired degree of browning (for example "crispy") are set, the target color point corresponding to the target degree of cooking, in particular the target degree of browning, may be calculated therefrom or retrieved from a data store.

It is an embodiment that the steps (a) and (b) are repeatedly carried out chronologically in succession. As a result, the color coordinates of the food to be cooked or the surface of the food to be cooked may be advantageously evaluated at different times and thus dynamic effects may also be considered. In particular, color coordinates of a food to be cooked determined chronologically in succession may be evaluated for determining a target degree of cooking of the food to be cooked and/or a remaining cooking time.

It is a development that the chronologically successive color coordinates are evaluated pixel by pixel, for example by image comparison. For example, difference images may be generated and evaluated for determining the target degree of cooking and/or the remaining cooking time. Reaching a target degree of cooking may thus be established, for example, by a chronological change of the color coordinates for at least 70% of the pixels being below a specific threshold value and optionally these pixels being within a certain distance from a target degree of cooking.

It is an embodiment that a curve progression of at least one color coordinate is evaluated for determining the target degree of cooking of the food to be cooked and/or the remaining cooking time. Thus states of food to be cooked (for example a degree of cooking, specifically a degree of browning) may be advantageously evaluated in a particularly flexible and reliable manner. For evaluating the temporal progression, the known methods for curve evaluation or curve discussion may be used, for example determining maximum or minimum points, saddle points, point of high gradient, etc. In the exemplary case of an HSX image, for example, the curve progression may be a chronological change of a—normalized or non-normalized—color angle of the color value and/or a—normalized or non-normalized—change to a degree of saturation.

The object is also achieved by a household cooking appliance having a cooking chamber and at least one camera for recording pixel-based images, wherein the household cooking appliance is configured for carrying out the method as described above. The household cooking appliance may be configured similarly to the method and has the same advantages.

The evaluation may take place in the household cooking appliance or outside the household cooking appliance, for example in an external data processing apparatus, such as a network server or a cloud computer. When evaluated in the household cooking appliance this has a corresponding data processing apparatus, and in the case of external evaluation a communication interface with an external data processing apparatus. The method in principle may also be carried out so as to be distributed in any manner between the household cooking appliance and the external data processing apparatus.

BRIEF DESCRIPTION OF THE DRAWINGS

The above-described properties, features and advantages of this invention and the manner in which they are achieved will become clearer and more easily understood in connection with the following schematic description of an exemplary embodiment which is described in more detail in connection with the drawings.

DETAILED DESCRIPTION OF EXEMPLARY EMBODIMENTS OF THE PRESENT INVENTION

Figure 1:
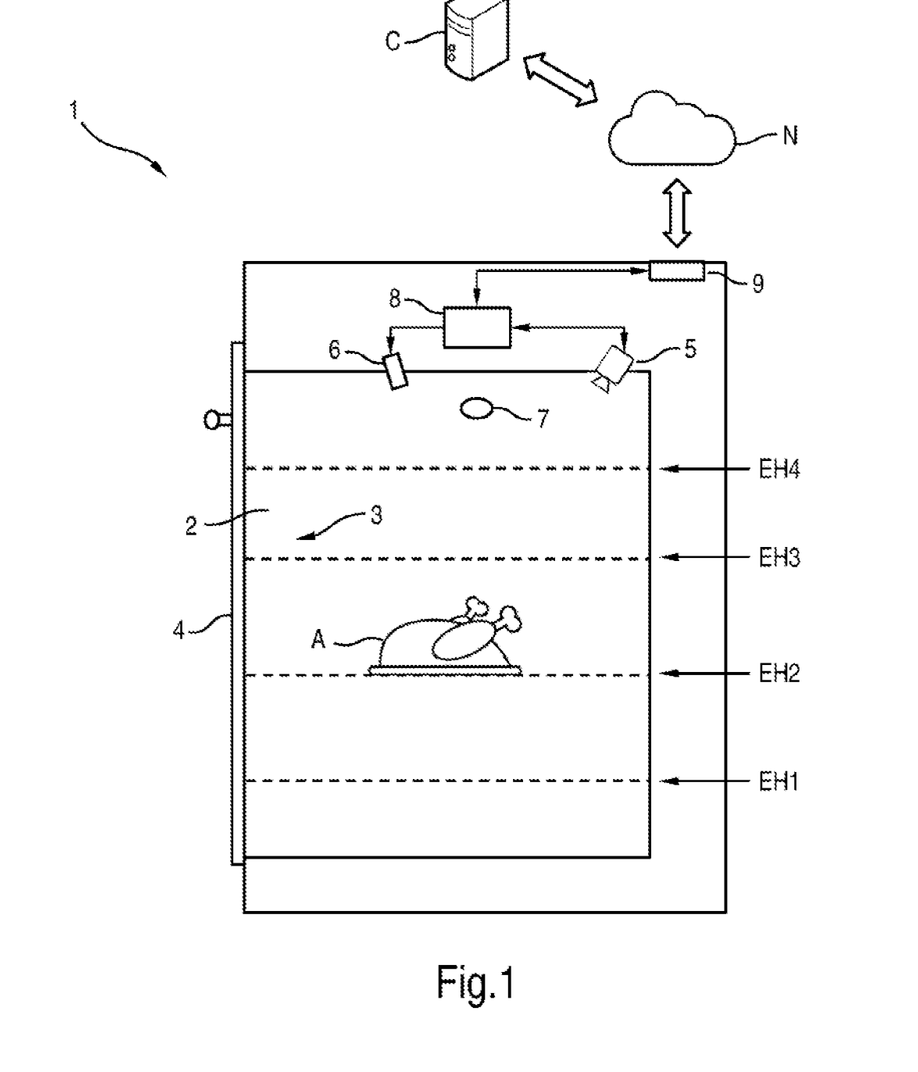
FIG. 1 shows as a sectional view in side view a sketch of a household cooking appliance with at least one camera.

FIG. 1 shows as a sectional view in side view a sketch of a household cooking appliance 1 with a cooking chamber 2, the front-side loading opening 3 thereof being closable by means of a cooking chamber door 4. The cooking chamber 2 has a plurality of insertion levels with the corresponding insertion heights EH1 to EH4, wherein the insertion height EH1 is in the vicinity of a bottom of the cooking chamber 2 and the insertion height EH4 is in the vicinity of a ceiling of the cooking chamber 2. Here the food to be cooked A, which itself is at a certain height, is placed at the second insertion height EH2, for example on an oven rack or baking sheet (not shown) inserted in the associated insertion level.

A color camera 5 is attached to the ceiling of the cooking chamber 2, however different cameras (not shown) may also be present. The color camera 5 is designed (i.e. configured and arranged) to record pixel-based color images from above or from obliquely above from the cooking chamber 2.

The household cooking appliance 1 also has at least one lighting apparatus for illuminating the cooking chamber 2, for example having a spotlight (for example LED spotlight) 6 in the region of the ceiling and a spotlight (for example LED spotlight) 7 in the region of the left-hand and/or right-hand side wall of the cooking chamber 2. The brightness distribution produced during the operation of the spotlights 6, 7 is non-homogenous in the horizontal plane due to the light cone thereof in the cooking chamber 2 and is also dependent on the measured height in the cooking chamber 2. Overall in the cooking chamber a non-homogenous light distribution is produced in all three spatial directions.

The color camera 5 and the spotlights 6, 7 are connected to a control apparatus 8 which may also be designed as a data evaluation apparatus.

The control apparatus 8 may also be connected to a communication module 9 (for example an Ethernet module, a WLAN module, etc.) and via the communication module 9 for example via a network N to a computer C which is external to the appliance. As a result, it is possible to outsource data processing operations or computing capacity entirely or partially from the household cooking appliance 1, for example to retain it in the so-called cloud.

Figure 2:
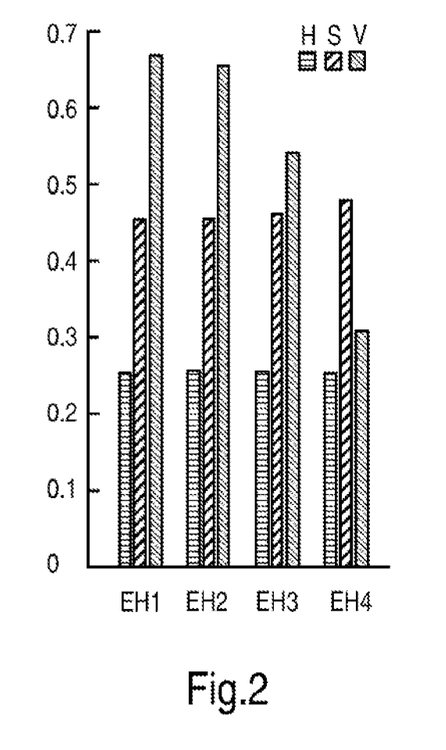
FIG. 2 shows the plotting of an average value of the different color space coordinates of an HSV image of a white reference as a function of an insertion height.

FIG. 2 shows the plotting of an average value of the pixel-related values for the different color space coordinates or channels H (color value), S (saturation) and V (brightness) of an HSV image of a white reference as a function of the insertion heights EH1 to EH4. The color coordinates H, S and V here are normalized to a maximum value of "1" as follows: the color value H is normalized to 360° (a normalized color value H=0 thus corresponds to a color angle of 0° or 360°, a color value of 0.5 corresponds to a color angle of 180°, etc.) whilst the color space coordinates S and V are normalized to 100% (thus a normalized value of 0.5 corresponds to a saturation of 50% or a brightness of 50%, etc.). The HSV image may be recorded directly or indirectly (for example via an RGB image).

The average values relating to the pixels or the area of the white reference of the H and S channels H, S are approximately constant for the insertion levels EH1 to EH4, whilst the V channel V significantly changes.

Figure 3:
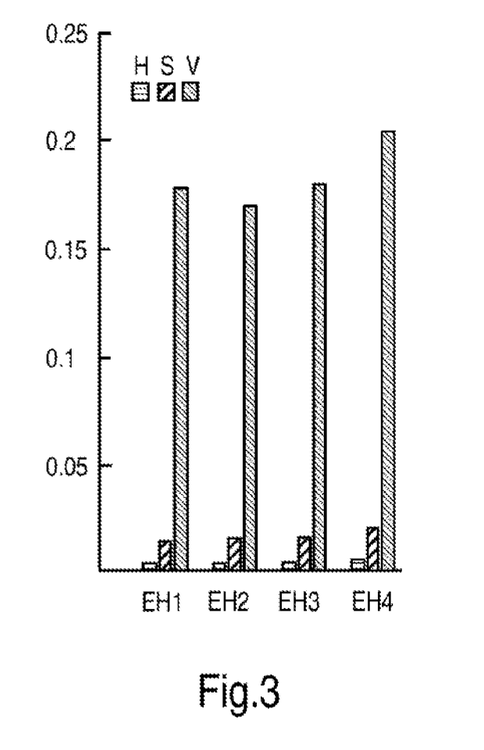
FIG. 3 shows a standard deviation for the different color coordinates of an HSV image of a white reference as a function of an insertion height.

FIG. 3 shows a standard deviation for the different color coordinates or channels H, S, V of the HSV image of FIG. 2 as a function of the insertion heights EH1 to EH4. The standard deviation in the V channel V is substantially greater than in the H and S channel H, S. This means that the H and S values of the individual pixels are approximately constant within the area of the white reference at the respective insertion heights EH1 to EH4.

A browning assessment of the food to be cooked A by considering the brightness is consequently very susceptible to error, in particular when the insertion height EH1 to EH4 and the height and shape of the food to be cooked are not known.

Figure 4:
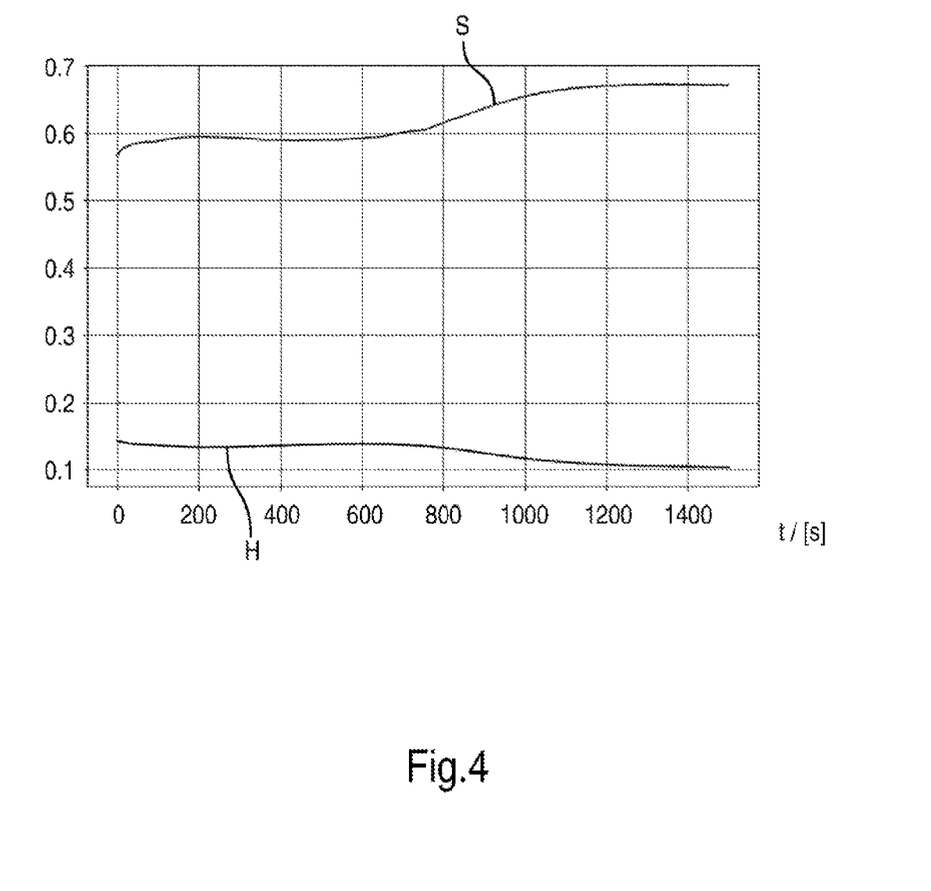
FIG. 4 shows a curve progression of standardized color coordinates of an HSV image of a food to be cooked over a duration of a cooking operation.

FIG. 4 shows a curve progression of the normalized color coordinates H and S similar to FIG. 2 of an HSV image of an upper side of a food to be cooked A in the form of a mozzarella-type pizza over a time t of an oven operation in seconds.

From approx. t=800 s the values for H (lower curve) and V (upper curve) start to change significantly, and namely H reduces and S rises. The curves or curve progressions after t approx. 1200 s then transition into a respective plateau state. This change of H and S corresponds to a browning of the surface of the pizza, so that the browning may also be reliably identified without considering the brightness value S.

From the curves or curve progressions for H and S it is possible to determine when a target degree of cooking and/or remaining cooking time has been reached. If, for example, the time until the start and/or the finish of the browning is known, then the time before the target degree of cooking and/or remaining cooking time is reached may be looked up by means of, for example, experimentally determined tables or characteristic curves.

Figure 5:
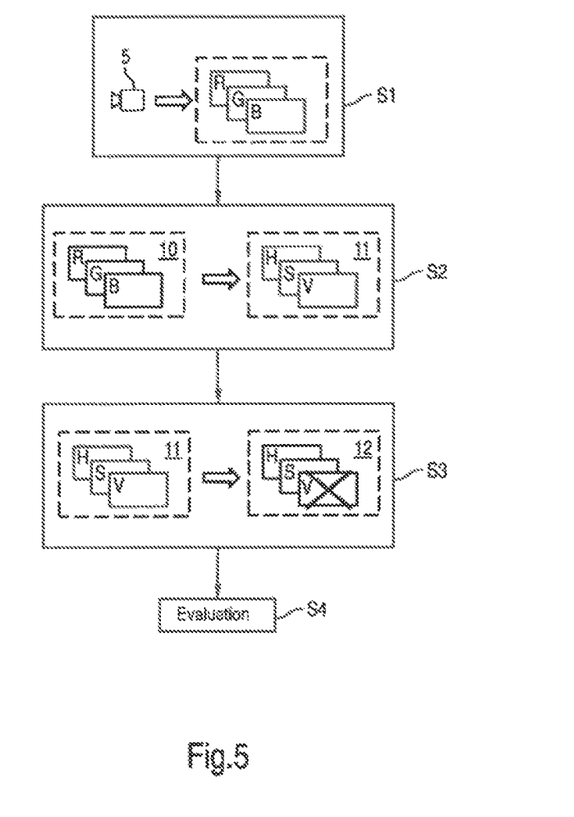
FIG. 5 shows a method sequence for preparing an evaluation of a recorded image for operating the household cooking appliance.

FIG. 5 shows a method sequence for preparing an evaluation of an RGB image 10 recorded in a step S1 by the camera 5 for operating the household cooking appliance 1. For example, in order to reduce the susceptibility to error during the browning assessment, the brightness information which is highly susceptible to error is omitted or excluded from further evaluation.

To this end, in a step S2 the recorded RGB image 10 with its channels R (red), G (green) and B (blue) is converted or transformed into an HSV image 11 with its channels H, S and V.

In a step S3 the V channel is separated, resulting in a brightness-normalized HS image 12, the quantity of data thereof being less by approx. a third than that of the HSV image 11. The V channel V is thus not used in step S4 for further evaluation, as indicated by being crossed out.

The steps S3, S3 and/or S4 may run entirely or partially on the control apparatus 8 and/or on the computer C.

Naturally, the present invention is not limited to the exemplary embodiment shown.

Generally "a", "an", etc. may be understood to mean a singular or a plural, in particular in the sense of "at least one" or "one or more" etc. provided this is not explicitly excluded, for example by the expression "exactly one", etc. Numerical indicator may also encompass precisely the specified number and a conventional tolerance range, provided this is not explicitly excluded.

The invention claimed is:

1. A method for operating a household cooking appliance, said method comprising:
    (a) recording with a camera a recorded image of food within a cooking chamber of the household cooking appliance, wherein the recorded image comprises pixels and each pixel comprises color space data including brightness values;
    (b) generating a brightness-normalized image from the recorded image by removing the brightness values from the pixels and using the remaining color space data; and
    (c) determining a degree of cooking of the food based on evaluating the brightness-normalized image.

2. The method of claim 1, wherein the brightness-normalized image is generated from an HSX image.

3. The method of claim 1, wherein the recorded image is an RGB image, and further comprising:
    converting the RGB image into an HSX image; and
    generating the brightness-normalized image from the HSX image by removing the brightness values.

4. The method of claim 1, wherein the degree of cooking is a degree of browning of the food to be cooked and illustrated in the recorded image.

5. The method of claim 1, further comprising determining a reaching of a target degree of cooking of the food to be cooked by reaching a target color point of the food to be cooked which target color point is defined by the remaining color coordinate or an environment thereof.

6. The method of claim 1, wherein steps (a), (b), and (c) are repeatedly carried out chronologically in succession and color coordinates of the food to be cooked are evaluated chronologically in succession for determining a target degree of cooking of the food to be cooked and/or a remaining cooking time.

7. The method of claim 6, further comprising evaluating a curve progression of a color coordinate for determining the target degree of cooking of the food to be cooked and/or the remaining cooking time.

8. A household cooking appliance, comprising:
    a cooking chamber;
    a camera; and
    a control apparatus connected to the camera and configured to:
        record a recorded image of food within the cooking chamber with the camera, wherein the recorded image comprises pixels and each pixel comprises color space data including brightness values;
        generate a brightness-normalized image from the recorded image by removing the brightness values from the pixels and using the remaining color space data; and determine a degree of cooking of the food based on evaluating the brightness-normalized image.

9. The household cooking appliance of claim 8, wherein the brightness-normalized image is generated from an HSX image.

10. The household cooking appliance of claim 8, wherein the recorded image is an RGB image which is converted into an HSX image, with the brightness-normalized image being generated from the HSX image by removing the brightness values.

11. The household cooking appliance of claim 8, wherein reaching a target degree of cooking of the food to be cooked is determined by reaching a target color point of the food to be cooked which target color point is defined by the remaining color coordinate or an environment thereof.

12. The household cooking appliance of claim 8, wherein the camera is configured to repeatedly record images chronologically in succession, and said control apparatus is configured to evaluate color coordinates of the food to be cooked chronologically in succession for determining a target degree of cooking of the food to be cooked and/or a remaining cooking time.

13. The household cooking appliance of claim 12, wherein the control apparatus is configured to evaluate a curve progression of at least one of the color coordinates for determining the target degree of cooking of the food to be cooked (A) and/or a remaining cooking time.

\* \* \* \* \*